United States Patent
Wahlberg et al.

(10) Patent No.: US 11,943,217 B2
(45) Date of Patent: Mar. 26, 2024

(54) ASSOCIATION VIA BROADCAST

(71) Applicant: Spotify AB, Stockholm (SE)

(72) Inventors: Jimmy Wahlberg, Uppsala (SE); Nicklas Söderlind, Stockholm (SE)

(73) Assignee: Spotify AB, Stockholm (SE)

( * ) Notice: Subject to any disclaimer, the term of this patent is extended or adjusted under 35 U.S.C. 154(b) by 0 days.

(21) Appl. No.: 17/592,619

(22) Filed: Feb. 4, 2022

(65) Prior Publication Data

US 2022/0158991 A1 May 19, 2022

Related U.S. Application Data

(63) Continuation of application No. 16/170,960, filed on Oct. 25, 2018, now Pat. No. 11,310,220.

(30) Foreign Application Priority Data

Apr. 23, 2018 (EP) .................................. 18168700

(51) Int. Cl.
*H04L 29/06* (2006.01)
*H04L 9/40* (2022.01)
*H04L 67/10* (2022.01)

(52) U.S. Cl.
CPC ...... *H04L 63/0838* (2013.01); *H04L 63/0846* (2013.01); *H04L 63/0876* (2013.01); *H04L 63/102* (2013.01); *H04L 63/108* (2013.01); *H04L 67/10* (2013.01)

(58) Field of Classification Search
CPC ............ H04L 63/0838; H04L 63/0846; H04L 63/0876; H04L 63/102; H04L 63/108; H04L 67/10; H04L 9/3228; H04W 12/08
See application file for complete search history.

(56) References Cited

U.S. PATENT DOCUMENTS

| 8,843,317 | B1 * | 9/2014 | Ledet | G01C 21/34 340/905 |
| 9,009,805 | B1 | 4/2015 | Kirkby et al. | |
| 9,176,214 | B2 * | 11/2015 | Berrett | A63F 13/79 |
| 9,210,144 | B2 | 12/2015 | Pearson | |
| 9,363,562 | B1 * | 6/2016 | Vitalis | H04N 21/4627 |
| 9,378,345 | B2 | 6/2016 | Zhang | |
| 9,445,220 | B2 | 9/2016 | Granbery | |

(Continued)

FOREIGN PATENT DOCUMENTS

| EP | 2405622 | 1/2012 |
| WO | 2016/036453 | 3/2016 |

OTHER PUBLICATIONS

Bluetooth low energy beacon, Wikipedia {Dec. 10, 2017). Available at: https://en.wikipedia.org/wiki/Bluetooth _low_ energy_ beacon.

(Continued)

*Primary Examiner* — Khalid M Almaghayreh
(74) *Attorney, Agent, or Firm* — Merchant & Gould P.C.

(57) ABSTRACT

A target device is associated with a source device. A system includes a target device that enters an association mode, obtains an identification code, and broadcasts the identification code. A source device receives the broadcast, obtains authorization to associate with the target device, and provides a message to an association server. The association server receives the message and associates the target device and the source device in response thereto.

18 Claims, 7 Drawing Sheets

(56) References Cited

U.S. PATENT DOCUMENTS

| | | | |
|---|---|---|---|
| 9,537,659 B2* | 1/2017 | Yin | H04L 9/3236 |
| 9,628,514 B2* | 4/2017 | Kaufman | H04L 67/14 |
| 10,762,494 B2* | 9/2020 | Chiang | G06Q 20/3272 |
| 2006/0085862 A1 | 4/2006 | Witt | |
| 2010/0071070 A1 | 3/2010 | Jawa | |
| 2013/0265857 A1* | 10/2013 | Foulds | G08C 23/02 367/199 |
| 2014/0370879 A1* | 12/2014 | Redding | H04M 3/42178 455/419 |
| 2015/0172277 A1 | 6/2015 | Hoggan | |
| 2016/0066004 A1 | 3/2016 | Lieu et al. | |
| 2017/0019394 A1 | 1/2017 | Yastrebenetsky | |
| 2017/0195313 A1 | 7/2017 | Kirkby | |
| 2017/0270560 A1* | 9/2017 | Duggal | H04N 21/812 |
| 2018/0014197 A1 | 1/2018 | Arana | |
| 2019/0104128 A1* | 4/2019 | Carol | H04L 9/3226 |
| 2019/0215673 A1* | 7/2019 | Choi | H04L 47/20 |
| 2019/0327225 A1 | 10/2019 | Wahlberg | |

OTHER PUBLICATIONS

EP Communication in Application 18168700.5, dated Jan. 8, 2020, 4 pages.
EP Communication in Application 18168700.5, dated Oct. 15, 2019, 4 pages.
EP Communication in Application 18168700.5, dated Nov. 9, 2018, 4 pages.
EP Communication in Application 18168700.5, dated Feb. 4, 2019, 7 pages.
EP Communication in Application 18168700.5, dated Jul. 9, 2019, 4 pages.
European Extended Search Report for European Application No. 18168700.5, dated Jul. 10, 2018.
European Extended Search Report in Application 20207362.3, dated Dec. 11, 2020, 5 pages.
European Intention to Grant in Application 20207362.3, dated Dec. 14, 2021, 7 pages.
Lakshminarayanan. A. et al., "Practical device association protocols for wireless enabled personal devices," IEEE Wireless Communications and Networking Conference, 2005, 2005, pp. 2484-2489 vol. 4, doi: 10.1109/WCNC.2005.1424904. (Year: 2005).
Lindh, Joakim, "Bluetooth® low energy Beacons," Application Report, Texas Instruments Inc. (Jan. 2015).
European Extended Search Report in Application 22173475.9, dated Aug. 2, 2022, 11 pages.
European Communication pursuant to Article 94(3) EPC in Application 22173475.9, dated Aug. 21, 2023, 6 pages.

* cited by examiner

ASSOCIATION VIA BROADCAST

CROSS-REFERENCE TO RELATED APPLICATION

This application is a continuation of U.S. patent application Ser. No. 16/170,960, filed Oct. 25, 2018, which claims priority to European Patent Application No. 18168700.5, titled "ASSOCIATION VIA BROADCAST", filed Apr. 23, 2018, which are incorporated by reference herein in their entirety.

TECHNICAL FIELD

The present disclosure relates to technical solutions for associating a target device with credentials or an account of a source device.

BACKGROUND

The process of associating a software or hardware product with an account of a user often includes the user providing a username and password using a tactile or virtual keyboard. However, there are technical drawbacks and challenges with this process: not all devices have a keyboard (e.g., voice-first devices); not all keyboards are available for use (e.g., for attention or accessibility reasons); and username-password combinations are not always ideal for authentication, among others. Login difficulties are compounded by frequent switching of accounts, such as among family members sharing a device or when providing guest access.

While advancements have been made in transferring login credentials from one device to another, technical challenges still remain. Some techniques include pairing an already logged-in device with a non-logged-in device and transferring the credentials from the logged-in device to the non-logged-in device via an auxiliary channel, such as using HTTP on a local network (e.g., using zero configuration networking). Other techniques include device pairing over BLUETOOTH and transferring a login token over the connection. Typically, these techniques require an extra communication channel and, depending on the communication technique, consume significant energy resources for both devices. Such techniques further raise concerns when used for guest mode access. For example, where a connection is made via a same WI-FI network, sharing access credentials for the network can be undesirable for security or privacy purposes. Still other techniques use audio to transmit data, such as using broadband phase difference encoding.

US 2017/0019394 describes playing media items from a guest's media account on a host's media player. A guest device discovers a host media player over a wireless local area network. A token can is provided from the host media player to the guest device. The token is encoded into an audio file, which is played by the host media player. The audio is captured by the guest device and decoded into the token, which is transmitted to a server for verification.

US 2010/0071070 describes techniques for managing or restricting sharing of media assets over a network. There is trust attribute discovery logic for discovering a first set of trust attributes of a server computer and a second set of trust attributes of a client computer. The trust attribute discovery logic discovers network connectivity of the client computer, and a DRM configuration logic determines whether the network connectivity of the client computer satisfies the trust criteria. Network connectivity can use an Ad Hoc network, a home network or a wireless network and can use a zero configuration network protocol and/or a multicast Domain Name System (DNS) protocol and/or a DNS-SD Service Discovery protocol, or some combination thereof.

US 2015/0172277 describes facilitating zero sign-on access to media services depending on trust credentials. The trust credentials may be cookies, certificates, and other data sets operable to be stored on a device used to access the media services such that information included therein may be used to control the zero sign-on capabilities of the user device.

SUMMARY

The present disclosure provides methods, apparatuses, and computer-readable products for using audio to associate a target device with credentials of a source device.

In an example, there is a system that includes a target device, a source device, and an association server. The target device has one or more target device processing devices coupled to a target device memory device storing target device instructions which when executed cause the one or more target device processing devices to: enter an association mode; obtain an identification code; and broadcast the identification code. The source device has one or more source device processing devices coupled to a source device memory device storing source device instructions which when executed cause the one or more source device processing devices to: receive the identification code; obtain authorization to associate with the target device; and send a source device authorization message to an association server. The association server has one or more association server processing devices coupled to an association server memory device storing association server instructions which when executed cause the one or more association server processing devices to: receive the source device authorization message; and associate the target device and the source device.

In an example, obtaining the identification code includes: sending an identification code request to the association server; and receiving the identification code from the association server. In an example, the association server instructions further cause the one or more association server processing devices to: receive the identification code request from the target device; generate the identification code; and provide the identification code to the target device. In an example, generating the identification code includes generating a time-limited identification code. In an example, broadcasting the identification code includes broadcasting the identification code using a low-energy radiofrequency transmission protocol. In an example, broadcasting the identification code includes broadcasting the identification code as part of a service set identifier. In an example, the target device instructions further cause the one or more target device processing devices to: ignore a response directly to the broadcast. In an example, obtaining authorization to associate with the target device includes providing a user interface to obtain user authorization to associate with the target device. In an example, sending the source device authorization message to the association server includes sending the identification code. In an example, associating the target device and the source device is performed responsive to receiving a target device authorization message.

In an example, there is a method that includes receiving an identification code request from a target device; generating an identification code; providing the identification code to the target device; receiving, from a source device, a source device authorization message that includes the identification code; and associating the target device and the source device. In an example, associating the target device and the source device includes updating one or more records to indicate that the target device is associated with a source device account. In an example, associating the target device and the source device includes: obtaining source device credentials for a source device account; and providing the source device credentials for the source device account to the target device. In an example, obtaining the source device credentials for the source device account includes generating new credentials. In an example, the method further includes providing a target device authorization request to the target device; and receiving a target device authorization message, wherein associating the target device and the source device is performed responsive to receiving the target device authorization message.

BRIEF DESCRIPTION OF THE DRAWINGS

The features and advantages of the present disclosure will become more apparent from the detailed description set forth below when taken in conjunction with the following drawings.

DETAILED DESCRIPTION

The example embodiments presented herein are directed to systems, methods, and non-transitory computer-readable medium products for associating a target device with credentials of a source device based on an identifier broadcast by the target device. This is for convenience only and is not intended to limit the application of the present invention. After reading the following description, it will be apparent to one skilled in the relevant art how to implement the following disclosure in alternative embodiments.

As used herein, "credentials" are data usable by a device to at least access content. For instance, credentials are usable for authentication. In another instance, credentials are usable to gain access to particular services. In some of the example embodiments described below, credentials are associated with a first account (e.g., the credentials usable to initiate a login process for the first account to access content associated with the account). In an example, using credentials to access content includes performing an authentication process with an application or server, such as using OAUTH 2.0, OPENID CONNECT (maintained by the OPENID FOUNDATION), SAML (maintained by OASIS of Burlington, MA), or other standards, protocols, or techniques. Other uses for, and examples of, credentials will be apparent to one of skill in the art.

In some examples, the credentials are representative of a username and password for a first account. In some instances, the credentials are use-limited or time-limited, such as one-session-use credentials or credentials that are valid for limited amount of time.

As used herein, "target device" refers to a computing device with which credentials are to be associated.

As used herein, "source device" refers to a computing device with which the credentials are currently associated.

In an example, a target device enters an association mode. The target device connects to an association server to obtain an identification code. The target device broadcasts the identification code without regard to particular devices nearby. A source device detects the broadcast. The source device extracts the identification code from the broadcast. The source device provides a prompt via a user interface to obtain confirmation of associating a source device account with the target device. The source device receives confirmation over the user interface. In response to receiving the confirmation, the source device provides the identification code to the association server. The association server then provides credentials associated with the source device account to the target device for use in accessing content associated with the source device account.

System for Associating a Target Device with Source Device Credentials

Figure 1:
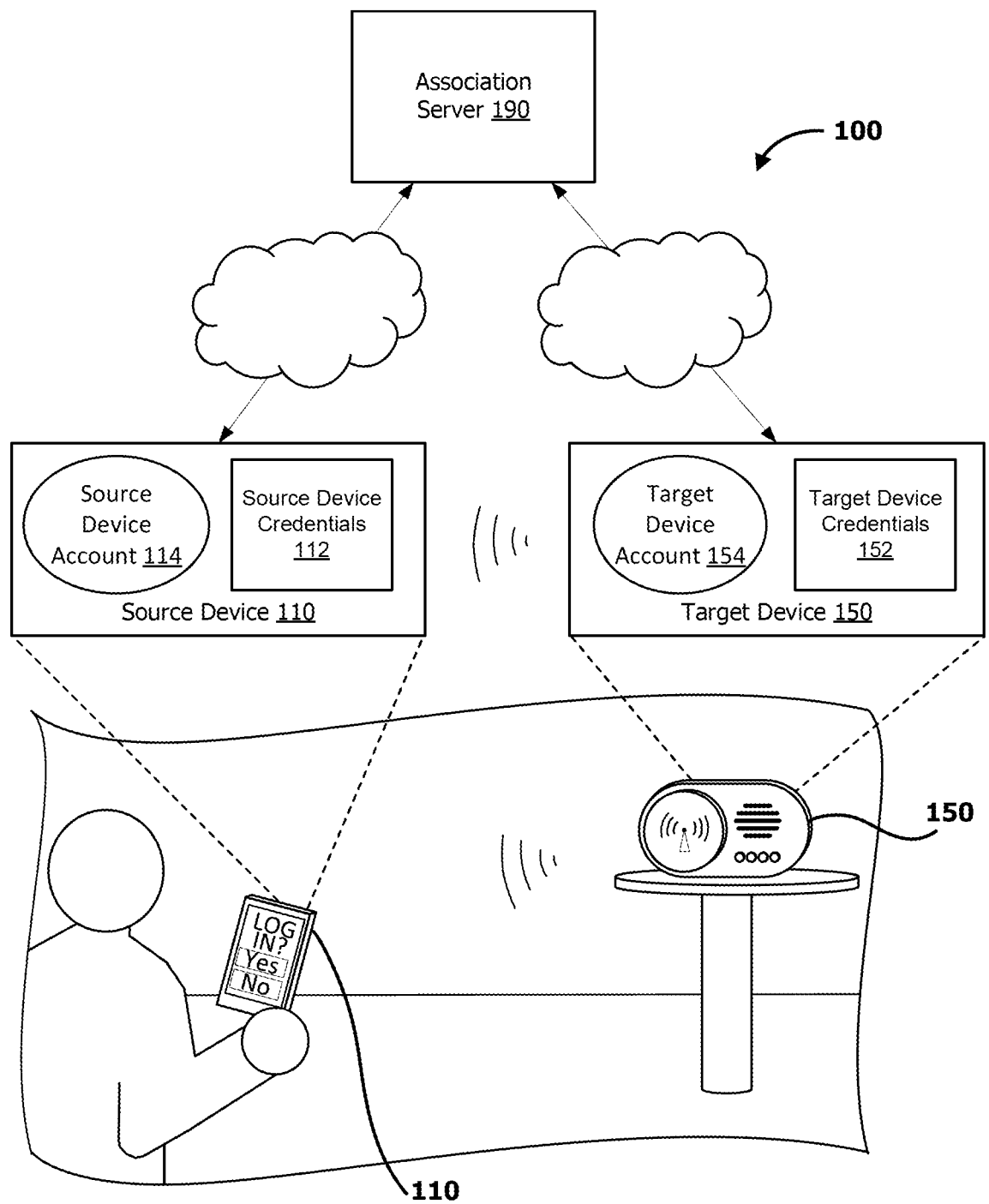
FIG. 1 illustrates an example system for associating a target device with a source device.

FIG. 1 illustrates an example system 100 for associating a target device 150 with a source device 110. The system 100 includes the source device 110, the target device 150, and an association server 190. The source device 110, the target device 150, and the association server 190 include various components usable to perform one or more of the operations described herein.

The source device 110 is a computing device. The source device 110 stores source device credentials 112. The source device credentials are associated with a source device account 114. In an example, the source device account 114 is associated with particular content. For instance, the source device 110 uses the source device credentials 112 to access the content associated with the source device account 114. The content is stored at the association server 190 or a system association therewith, in some examples.

The target device 150 is a computing device to which the source device credentials 112 are to be provided. In many examples, the target device 150 is already associated with target device credentials 152 associated with a target device account 154, such as by storing the target device credentials 152. The target device 150 is able to become associated with different credentials, such as the source device credentials 112. The target device 150 becomes associated with the source device credentials 112 as part of a guest mode via which the source device credentials 112 are associated with the target device 150, for instance.

The association server 190 is a computing device remote from the source device 110 and the target device 150. The association server 190 is connected to the source device 110 via a network. The association server 190 is connected to the target device 150 via a network. The association server 190 manages providing the source device credentials 112 to the target device 150. For instance, the association server 190 manages the source device account 114 and the target device account 154. In some examples, the association server 190 provides the content that the source device credentials 112 are used to access.

Process for Associating the Target Device with the Source Device Credentials

Figure 2A:
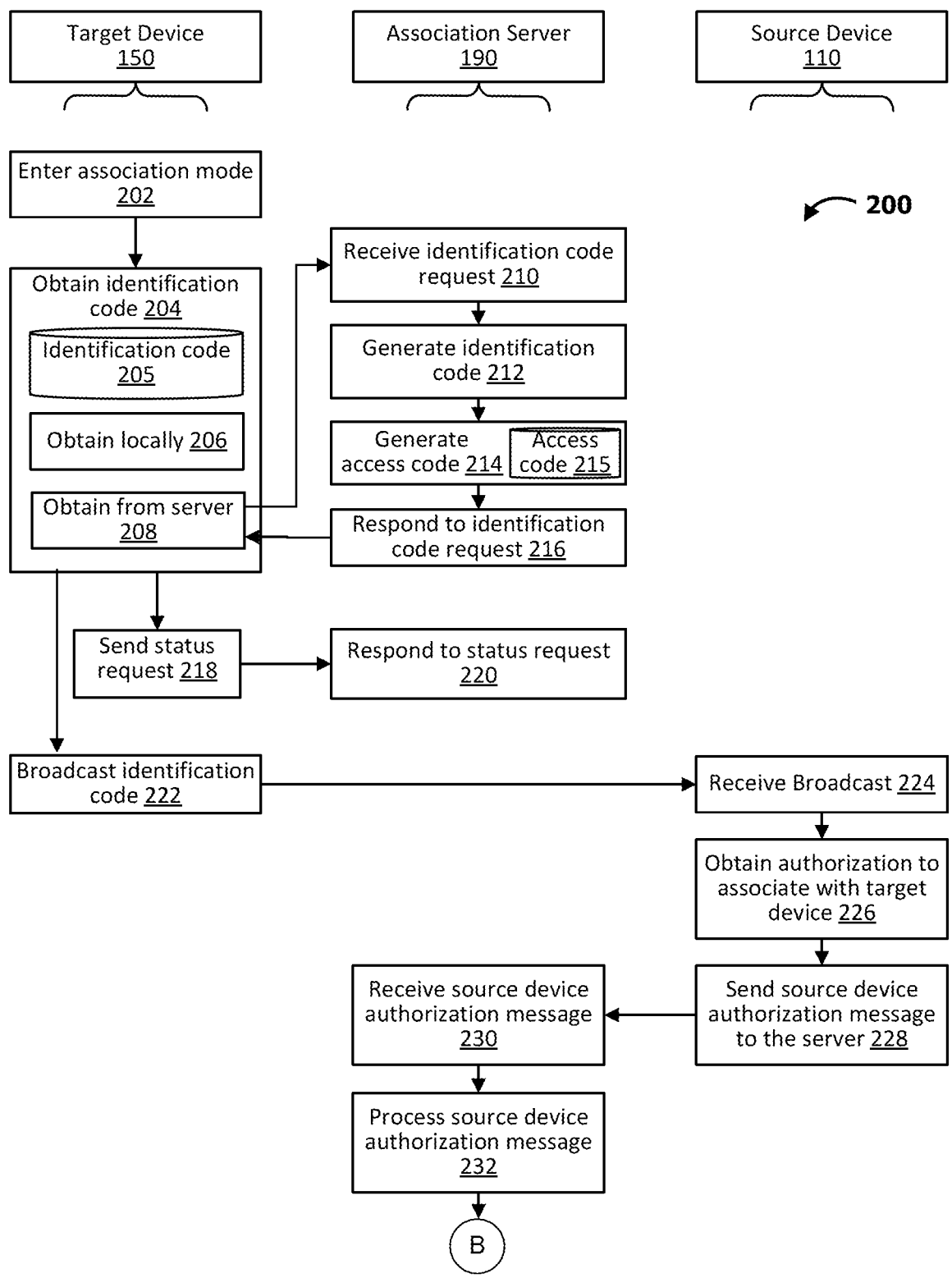
FIG. 2, which is made up of FIG. 2A and FIG. 2B, illustrates an example process for associating a target device with a source device.
Figure 2B:
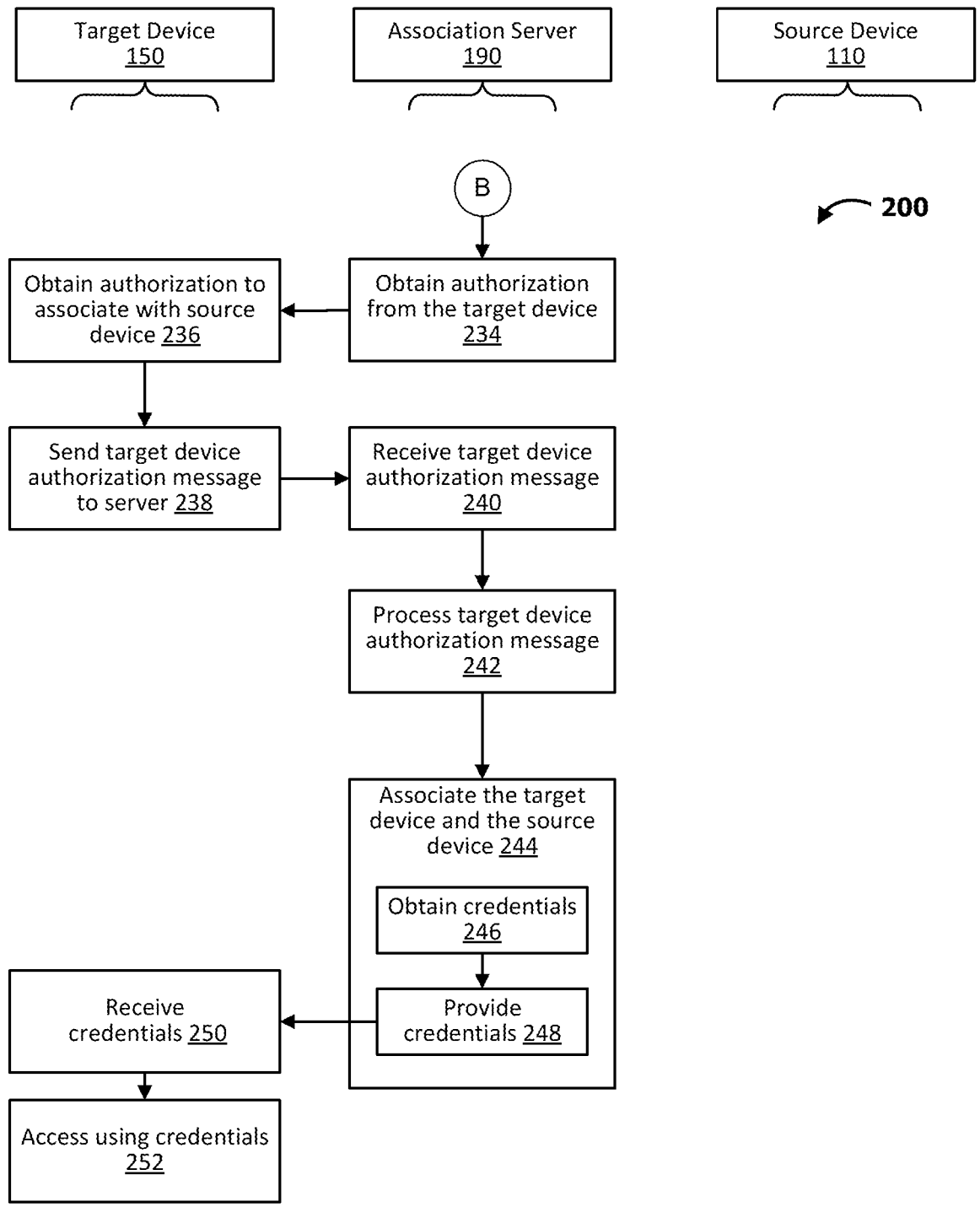

FIG. 2, which is made up of FIG. 2A and FIG. 2B, illustrates a process 200 for associating a target device 150 with a source device 110, such as source device credentials 112 thereof. The process 200 is performed by various components, such as the components described above in connection with system 100. As illustrated, the process 200 includes various operations performed by the source device 110, the target device 150, and an association server 190, though the process need not be so limited. More or fewer operations may be performed in some examples. One or more of the operations may be performed by different devices. One or more of the operations may be performed in response to one or more other operations completing. One or more of the operations may be performed concurrently or sequentially.

The process 200 begins with operation 202, at which the target device 150 enters an association mode. Entering the association mode includes preparing to become associated with a particular account or credentials, as will be described in more detail below. The target device 150 can enter the association mode in response to one or more of a variety of causes.

In one example, the target device 150 enters the association mode responsive to attempting to operate without credentials. For instance, the target device 150 determines whether the target device 150 has credentials with which to use. In the example, the target device 150 begins operating in the association mode in response to determining that it lacks credentials with which to use. The target device 150 can lack credentials (e.g., target device credentials 152) to use for a variety of reasons. In an example, the target device 150 lacks credentials when the target device 150 is powering up for a first time without being preconfigured with credentials. In another example, the target device 150 lacks credentials because the target device 150 finished executing log-out process. For instance, the target device 150 finished a log-out process in which the target device 150 disassociates itself from particular credentials.

In another example, the target device 150 enters the association mode responsive to the target device 150 receiving a signal. For instance, the target device 150 receives an electronic signal from another device, such as a message from the association server 190 or the source device 110. The target device 150 receives an acoustic signal from another device, for instance. In the example, the signal causes the target device 150 to enter the association mode. For instance, the target device 150 enters the association mode responsive to receiving the signal. In another instance, the signal is a user input signal, such as a user input signal (e.g., an utterance having a command for the target device to enter the association mode) received over a voice-based user interface of the target device 150.

The target device 150 can take one or more of a variety of actions in response to entering the association mode. In an example, the target device 150 prepares to become associated with credentials responsive to entering the association mode, such as by disassociating itself from the target device credentials 152.

At operation 204, the target device 150 obtains an identification code 205. In many examples, the target device 150 obtains the identification code 205 responsive to entering the association mode. The target device 150 can obtain the identification code 205 in a variety of ways, such as: obtaining the identification code 205 locally from the target device 150 (e.g., as described in connection with operation 206) or obtaining the identification code 205 from the association server 190 (e.g., as described in connection with operation 208).

At operation 206, the target device 150 obtains the identification code 205 from storage local to the target device 150 (e.g., by accessing a data store of the target device 150). In an example, the identification code 205 is a locally-stored identification code. For instance, the identification code 205 includes or is based on the device identifier of the target device 150 (e.g., the identification code 205 is a hash of the device identifier).

At operation 208, the target device 150 obtains the identification code 205 from the association server 190. For example, obtaining the identification code 205 includes the target device 150 sending an identification code request to the association server 190. In another example, the target device 150 obtains the identification code 205 from the association server 190 by logging into the association server 190. For instance, the target device 150 logs into the association server 190 by providing a one-time-password to the association server 190, such as an unused one-time-password stored in a one-time-password data store of the target device 150. The target device 150 then provides the one-time-password to the association server 190 as part of the identification code request. In such an example, the identification code request includes the one-time-password. Where the identification code request is an application programming interface call, the call can include the one-time-password as a parameter.

At operation 210, the association server 190 receives the identification code request (e.g., from the target device 150). The association server 190 can receive the identification code request in a variety of ways, such as over an application programming interface. The association server 190 can take one or more of a variety of actions in response to receiving the identification code request.

Where the identification code request includes a one-time-password, the association server 190 determines whether the one-time-password is valid. Responsive to the one-time-password being valid, the association server 190 continues processing the identification code request. Responsive to the one-time-password being invalid, the association server 190 stops processing the request.

At operation 212, the association server 190 generates the identification code 205. In an example, the association server 190 generates the identification code 205 by randomly or pseudo-randomly generating one or more portions of the identification code 205. The generated identification code 205 can be limited, such as a time-limited identification code (e.g., an identification code 205 that expires after a predetermined amount of time, such as fifteen minutes) or a use-limited identification code (e.g., the identification code 205 expires after being used a certain number of times). In an example, the identification code 205 is stored in a data structure.

In some examples, the association server 190 performs operation 214 in which the association server 190 generates an access code 215. The access code 215 is a code used by the target device 150 to access the association server 190. The access code 215 is used by the association server 190 to identify the target device 150, for instance. In an example, the association server 190 performs one or more of the following actions: storing data in association with the access code 215, using the access code 215 as a session identifier, and using the access code 215 to authenticate the target device 150 for a session, among other actions. In an example, the one-time-password that the target device 150 used to access the association server 190 to request the identification code may have expired, and the target device 150 uses the access code 215 to access one or more services of the association server 190 (e.g., the target device 150 provides the access code 215 in future requests).

At operation 216, the association server 190 responds to the identification code request, such as by sending an identification code request response to the target device 150.

In an example, the identification code request response includes the identification code 205. In another example, the identification code request response also includes the access code 215

Returning to operation 208, in an example obtaining the identification code 205 from the association server 190 further includes receiving the identification code request response from the association server 190. In such examples, obtaining the identification code from the association server 190 includes extracting the identification code 205 from the identification code request response.

Returning to operation 204, the target device 150 obtained the identification code 205 (e.g., by obtaining the identification code 205 locally as in operation 206, by obtaining the identification code 205 from the association server 190 as in operation 208, or in other ways). Following operation 204, the flow moves to operation 222 to provide a broadcast of the identification code 205 and, optionally, to operation 218 to send a status request to the association server 190.

At operation 218, the target device 150 sends a status request to the association server 190, such as by sending the status request to the association server 190 regarding the association mode. In an example, the target device 150 sends the status request to one or both of: determine whether a source device 110 was detected and request a new identification code 205 (e.g., because the identification code 205 expired). For instance, the target device 150 determines that the identification code 205 expired and the status request in response thereto. In an example, responsive to sending the status request, the target device 150 receives from the association server 190 a new identification code 250 and the flow returns to operation 204. In some examples, the target device 150 provides the access code 215 with the status request (e.g., the status request includes the access code 215). In an example, the target device 150 sends the status request using an application programming interface of the association server 190. For instance, the target device 150 uses the application programming interface and provides the access code 215 as a parameter.

At operation 220, the association server 190 responds to the status request. Responding to the status request can include first receiving the status request. After receiving the status request, the association server 190 determines whether the status request includes a valid access code 215, for instance. Responsive to determining that the status request does not include a valid access code 215, the association server 190 ignores the status request or returns an error. In an example, the association server 190 determines the identification code 205 associated with the access code 215. The association server 190 can query a data structure using the access code 215 to determine whether an authorization was received for the identification code 205 (see operation 230, below). In an example, the association server 190 determines whether the identification code 205 is valid (e.g., not expired due to time or use). Responsive to determining that the identification code 205 is invalid (e.g., expired due to time), the flow returns to operation 212. The association server 190 also sends a message to the target device 150 to cause the target device 150 to exit the association mode, in some instances, responsive to determining that the identification code 205 is invalid.

At operation 222, the target device 150 broadcasts the identification code 205, such as by providing a broadcast that includes the identification code 205. The target device 150 can broadcast the identification code 205 in a variety of ways. In an example, the target device 150 broadcasts the identification code using one or more of the following technologies: a wireless personal area network technology, a low-energy technology, and a radio frequency broadcast technology, among other technologies. Where the target device 150 broadcasts using a radio frequency technology, the radio frequency broadcast can have one or more attributes: have a frequency of approximately 2.4 GHz, use a low-energy radiofrequency transmission protocol (e.g., BLUETOOTH LOW ENERGY maintained by the BLUETOOTH SPECIAL INTEREST GROUP), and use a WI-FI protocol, among other attributes. In an example, the identification code 205 can be broadcast as part of a service set identifier (SSID), such as a WI-FI SSID. In an example, the target device 150 broadcasts the identification code 205 using an audio signal (e.g., the target device 150 encodes the identification code 205 in the audio signal using audio steganography and plays the audio signal through a speaker). In an example, the target device 150 broadcasts the identification code 205 in a light signal. In some instances, the target device 150 broadcasts the identification code 205 periodically or continuously.

In an example, the target device 150 broadcasts the identification code 205 without one or more of the following actions: pairing with a device (e.g., without pairing with the source device 110), encrypting the broadcast, responding to an answer from a device directly to the broadcast, and broadcasting with respect to a particular device (e.g., the broadcast is not directed to a particular device, such as directed to a device having a particular Internet protocol address), among other actions. For instance, the target device 150 broadcasts the identification code 205 to all nearby devices. In a further instance, the target device 150 is not receptive to responses directly to the broadcast, such as a pairing request in direct response to the broadcast. In an example, the target device 150 does not accept a connection responsive to the broadcast. For instance, the target device 150 broadcasts an SSID (e.g., a WI-FI SSID) but does not accept a connection request directed to the SSID from another device.

In some examples, the target device 150 broadcasts the identification code 205 as a payload of a message. In an example, the broadcast has a format recognizable by the source device 110 as being an association mode broadcast. For instance, the identification code 205 has a format recognizable as being part of an association mode. In an example, the broadcast includes a name of the target device 150. In an example, the broadcast includes a device type of the target device.

At operation 224, the source device 110 receives the broadcast, such as using an antenna. In an example the source device 110 executes an application that monitors for a broadcast (e.g., an application that continuously monitors for a broadcast). For instance, the application is a media-playback application. In an example, the source device 110 detects the broadcast. In an example, the source device 110 recognizes the broadcast as having a format associated with an association mode. For instance, the source device 110 recognizes the identification code 205 as having a format identifying the identification code 205 as part of an association mode. In an example, the source device 110 obtains, from the broadcast, (e.g., by parsing the content of the broadcast) one or more of: the identification code 205, a name of the target device 150, and a device type of the target device 150 from the broadcast.

In examples, the source device 110 performs one or more operations in response to receiving the broadcast, such as operation 226.

At operation 226, the source device 110 obtains authorization to associate with the target device 150, such as in response to receiving the broadcast in operation 224. In an example, the authorization is user authorization. For instance, the source device 110 provides a user interface to obtain user authorization to associate with the target device 150.

In an example, the user interface is a voice-based user interface, and the target device 150 obtains the user authorization with the voice-based user interface. For instance, the source device 110 verbally asks for user authorization over the voice-based user interface, and the source device 110 receives verbal authorization from the user over the voice-based user interface.

In an example, the user interface includes a visual element, such as by rendering one or more visual user interface elements at a display of the source device 110. For instance the source device 110 receives a selection of a visual user interface elements indicating that the user authorizes the association with the target device. In an example, the user interface includes a tactile element. For instance, the source device 110 receives authorization via a tactile user interface element (e.g., a button). In another example, the source device 110 receives the selection of one of the user interface elements via a virtual interface (e.g., a touch screen, a gesture sensor, etc.).

In still other examples, the source device 110 automatically provides authorization (e.g., without needing to receive contemporaneous authorization from the user). For instance, the source device 110 automatically provides authorization based on determining that a parameter allows automatic authorization.

Responsive to receiving an indication that that the user does not authorize the association, the source device 110 takes no further action regarding the broadcast. Responsive to receiving an indication that the user does authorize the association, the flow moves to operation 228 in which the source device 110 sends the authorization to the association server 190 via a source device authorization message.

At operation 228, the source device 110 sends a source device authorization message to the association server 190. In an example, the source device authorization message includes one or both of an identification of the source device account 114 and the identification code 205.

At operation 230, the association server 190 receives the source device authorization message. In an example, the association server 190 extracts the identification code 205 from the source device authorization message. In an example, the association server 190 extracts an identification of the source device account 114 from the source device authorization message.

At operation 232, the association server 190 processes the source device authorization message. In an example, processing the source device authorization message includes determining a device associated with the identification code 205 (e.g., by looking up a device identifier in a data structure that stores a device identifier in association with an identification code).

At operation 234, the association server 190 requests target device authorization from the target device 150. In an example, the association server 190 provides a target device authorization request to the target device 150. For instance, the target device request includes an identification of the source device 110 that provided the source device identification (e.g., the name of the source device 110).

At operation 236, the target device 150 obtains authorization to associate with the source device 110. In an example, the target device 150 obtains authorization to associate with the source device 110, such as in response to receiving the target device authorization request.

The target device 150 obtains authorization to associate with the source device 110. In an example, the target device 150 obtains the authorization (e.g., user authorization) responsive The authorization can be obtained in a variety of ways, such as by providing a user interface to obtain user authorization to associate with the source device 110. In an example, the target device 150 provides one or both of a visual user interface or a voice-based user interface. The target device then receives a selection of one of a user interface elements indicating that the user authorizes the association with the source device 110 in one or more of the following ways: via a tactile user input (e.g., via a button), via a virtual user input (e.g., via a touch screen or a gesture sensor), or via a verbal user input (e.g., via an utterance).

Responsive to receiving an indication that the user does not authorize the association, the process 200 terminates. Responsive to receiving an indication that the user does authorize the association, the flow moves to operation 238 and the target device 150 sends the authorization to the association server 190.

At operation 238, the target device 150 sends a target device authorization message to the association server 190. In an example, sending the target device authorization message includes accessing an application programming interface.

At operation 240, the association server 190 receives the target device authorization message, such as by receiving the target device authorization message over an application programming interface.

At operation 242, the association server 190 processes the target device authorization message, such as by determining whether the target device authorization message was received within a threshold amount of time.

At operation 244, the association server 190 associates the source device 110 and the target device 150, such as in response to receiving one or both of the target device authorization message and the source device authorization message. Though, in some examples, the association server 190 associating the target device 150 and the source device 110 is performed without receiving one or both of the target device authorization message and the source device authorization message. In an example, associating the source device 110 and the target device 150 includes performing credential management or account management based on the source device 110 and the target device. For instance, the association server 190 updates one or more records to indicate that the source device 110 and the target device 150 are associated or vice versa. In an example, the association server 190 associating the source device 110 and the target device 150 includes the association server 190 providing credentials to the target device 150, such as the source device credentials 112. For instance, associating the source device 110 and the target device 150 includes the association server 190 obtaining source device credentials 112 in operation 246 and the association server 190 providing the source device credentials 112 in operation 248.

At operation 246, the association server 190 obtains source device credentials 112 (e.g., the source device credentials 112 for the source device account 114). For instance, the association server 190 selects the source device credentials 112 from a data store that stores the source device credentials 112. The association server 190 selects the source device credentials 112 using an identifier of the source device 110. In other instances, the association server 190 obtains the source device credentials 112 by generating new source device credentials 112 associated with the source device account 114.

At operation 248, the association server 190 provides the source device credentials 112 to the target device 150. In an example, the association server 190 sends a message to the target device 150. The message includes the source device credentials 112.

At operation 250, the target device 150 receives the source device credentials 112. In many examples, the target device 150 stores the source device credentials 112 locally at the target device 150. For instance, the source device credentials 112 are stored for use in accessing services (e.g., services provided by the association server 190). In instances where the source device credentials 112 are for use in a guest mode, the source device credentials 112 can be stored in a temporary area (e.g., a temporary data structure in a data store on the target device 150) or are stored in association with a limit (e.g., a time limit or use limit).

In some examples, the association server 190 does not provide the source device credentials 112. Instead, the association server 190 provides an identifier associated with the source device credentials 112. For instance, the target device 150 uses the provided identifier in order to select credentials from among locally-stored credentials (e.g., the target device 150 already stores multiple different sets of credentials). In some examples, the association server 190 provides a decryption key with which to unlock or access locally-stored credentials.

At operation 252, the target device 150 accesses content using the source device credentials 112. In an example, the target device 150 uses the received source device credentials 112 to access services, such as a media server application.

Process for Guest and Primary Modes

Figure 3:
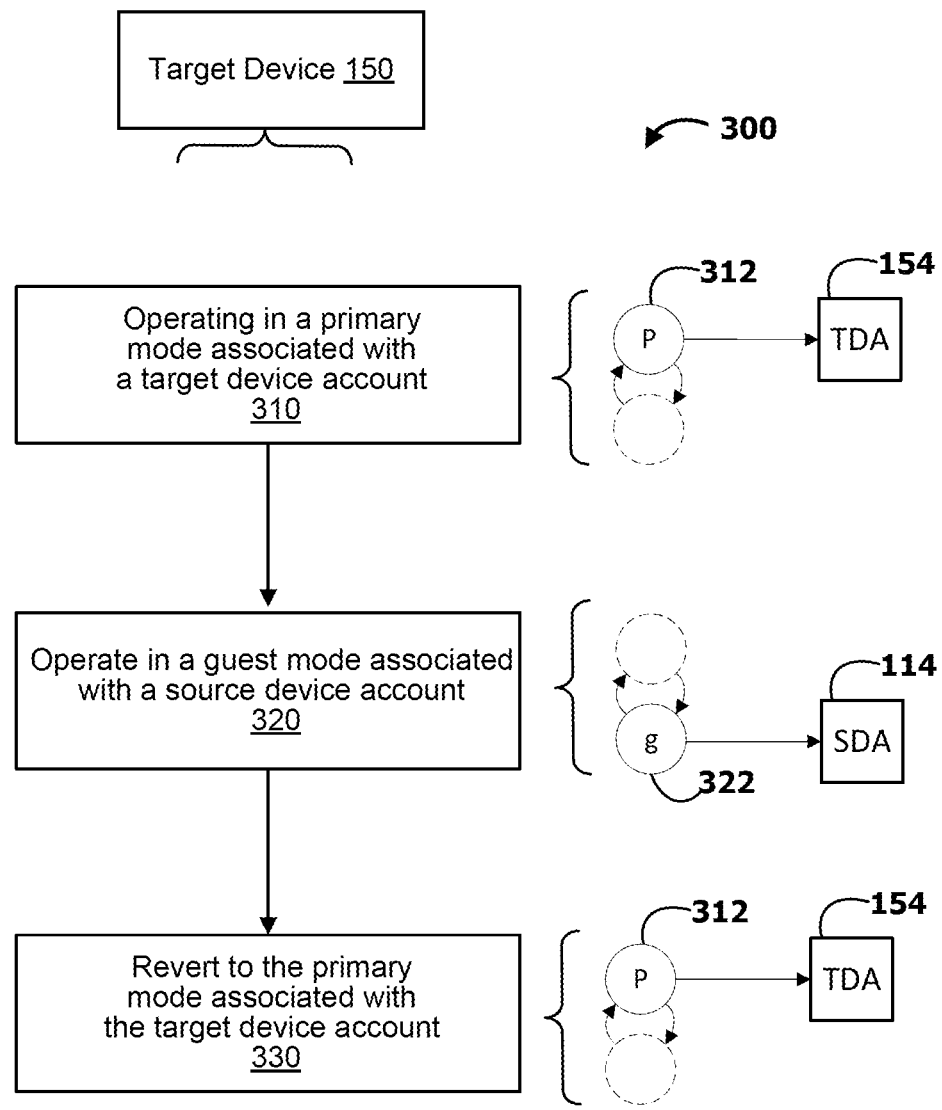
FIG. 3 illustrates an example process for operating a target device in a primary mode and a guest mode.

FIG. 3 illustrates a process 300 for operating the target device 150 in a primary mode 312 and a guest mode 322. The process 300 begins with operation 310.

At operation 310, the target device 150 operates in a primary mode 312 associated with the target device account 154. The primary mode 312 is a mode in which the target device 150 remains indefinitely (e.g., the primary mode 312 is a default mode). Operating the target device 150 in the primary mode 312 associated with a target device account 154 includes the target device 150 using the target device account 154 to access content associated with the target device account 154. For example, the target device 150 obtains one or more media content items using the target device account 154. For instance, obtaining the one or more media content items includes accessing a library of media content items associated with the target device account 154 or obtaining the one or more media content items according to a taste profile associated with the target device account 154.

In an example, the target device 150 leaves the primary mode 312 responsive to receiving or executing a command, such as a log-out command, a switch account command, or an enter association mode command. In many examples, the primary mode 312 is a mode associated with an account of owner of the target device 150.

In an example, while operating in the primary mode 312, the target device 150 receives a guest mode command. The guest mode command is a command that causes the target device 150 to begin the process of entering a guest mode. For instance, the guest mode command causes the flow of the process 300 to transition to operation 320. The target device 150 receives the guest mode command in any of a variety of ways. In an example, receiving the guest mode command includes receiving the guest mode command over a user interface. In an example, the target device 150 receives the guest mode command over a voice-based user interface. For instance, the target device 150 receives an utterance (e.g., "enter guest mode"). The utterance is analyzed (e.g., using natural language processing), and the target device 150 executes a guest mode process in response thereto. In another example, the target device 150 receives the guest mode command over a touch screen user interface. For instance, the target device 150 detects that a virtual user interface element has been actuated. In an example, the target device 150 receives the guest mode command over a gesture-based user interface. In an example, the target device 150 receives the guest mode command over a tactile user interface (e.g., the target device 150 detects that a tactile button has been actuated and executes a guest mode process in response thereto). In an example, the target device 150 receives the guest mode command from another device. For instance, the target device 150 receives a guest mode message from the association server 190. The target device 150 executes a guest mode process in response thereto.

At operation 320, the target device 150 operates in the guest mode 322 associated with an account other than the target device account 154. As illustrated, the other account is the source device account 114. Operating in the guest mode 322 takes various forms. Operating in the guest mode 322 includes, for instance, the target device 150 operating according to credentials associated with the source device account 114. The credentials can be obtained using any of a variety of techniques described herein, including but not limited to those described in relation to FIG. 2. In some instances, operating in the guest mode 322 includes the target device 150 operating with a limited set of permissions compared to the primary mode 312. For instance, while operating in the guest mode 322, the target device 150 may be unable to perform one or more of the following actions: downloading media content items to the target device 150, modifying an equalizer of the target device 150, accessing predetermined content, changing wireless settings of the target device 150, changing security settings of the target device 150, changing an ownership of the target device 150, changing account management settings of the target device 150, playing explicit tracks on the target device 150, locking the target device 150, and obtaining primary mode status on the target device 150, among other actions. For example, the target device 150 operating in the guest mode 322, the target device 150 receives user input associated with performing an action not permitted in guest mode, and the target device 150 does not perform the action. In an example, the target device 150 provides an error message in response thereto. For instance, the error message indicates that the action cannot be taken due to operating in the guest mode.

In an example, the guest mode 322 is a temporary mode. For instance, the target device 150 operates in the guest mode 322 for a limited amount of time (e.g., one hour, one day, one week, and one month). For instance, the guest mode 322 being a temporary mode includes the target device 150 operating in the guest mode 322 until a certain number of media content items are played (e.g., playback of one, two, three, or more media content items). For instance, the guest mode 322 being a temporary mode includes the target device 150 operating in the guest mode 322 until the occurrence of a particular event (e.g., receiving a revert command, detecting the presence of a device associated with the target device account 154). Once the temporary mode ends, the target device 150 reverts to the primary mode 312. In an example, reverting to the primary mode 312 includes operating the target device 150 using the account associated with the primary mode 312 (e.g., the target device account 154). In another example, the device operates in the guest mode 322 until a reversion command is received. In an example, receiving the reversion command includes receiving user input associated with reverting to the primary mode 312 over a user interface (e.g., receiving an utterance over a voice-based user interface of the target device 150 or receiving an indication that a virtual or physical user interface element associated with reversion has been actuated). In an example, the target device 150 provides an interface via which an account operating in a primary mode 312 customizes the permissions of the guest mode 322.

In another example, the target device 150 operates in the guest mode 322 until a device power event occurs. For instance, the target device 150 operates in the guest mode until the target device 150 powers on, powers off, enters a sleep mode, enters an inactive state, enters an active state, wakes up, restarts, loses power, or gains power, among others. The target device 150 then reverts to the primary mode 312 with the target device account 154.

In some examples, operating in a guest mode 322 includes the target device 150 storing credentials of the account associated with the primary mode 312. In an example, the target device 150 stores credentials associated with the primary mode in memory for later use. Storing the credentials in memory facilitates the target device 150 reverting from, for example, operating in the guest mode 322 associated with the source device account 114 to the primary mode 312 associated with the target device account 154 without re-receiving the credentials associated with the target device account 154, which saves the user time and reduces resource consumption (e.g., by not requiring the use associated with the target device account 154 to re-log into the target device 150).

At operation 330, the target device 150 reverts to the primary mode 312 associated with the target device account 154 from the guest mode 322. For instance, the reversion is triggered by one or more of the conditions or criteria described in operation 320. Reverting can include accessing credentials associated with the target device account 154 that are stored locally at the target device 150. In some examples, reverting includes obtaining the credentials from the association server 190 (e.g., the target device 150 accessing an application programming interface associated with the association server 190).

Device Environment

Figure 4A:
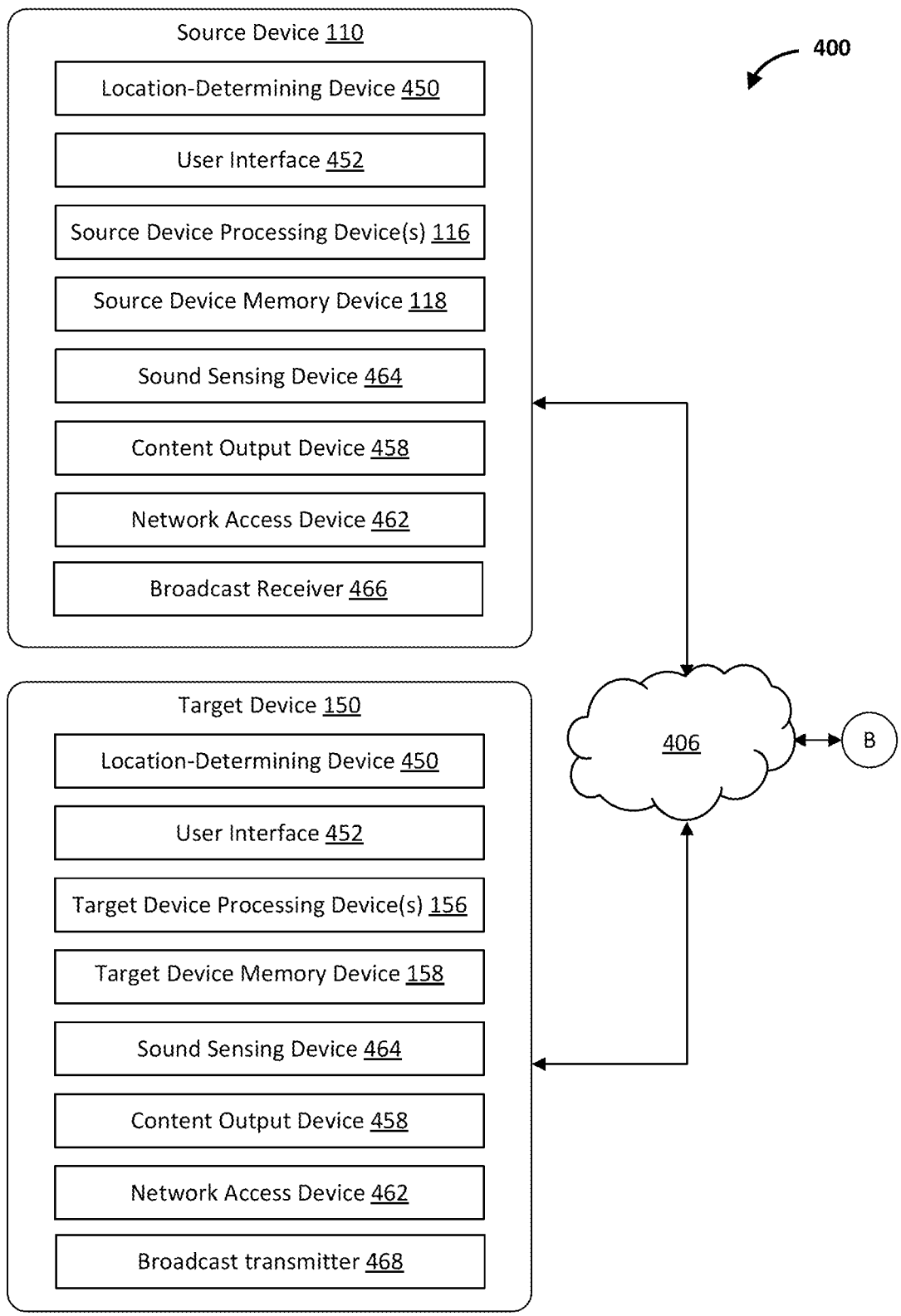
FIG. 4, which is made up of FIG. 4A and FIG. 4B, illustrates an example system for associating a target device with a source device.
Figure 4B:
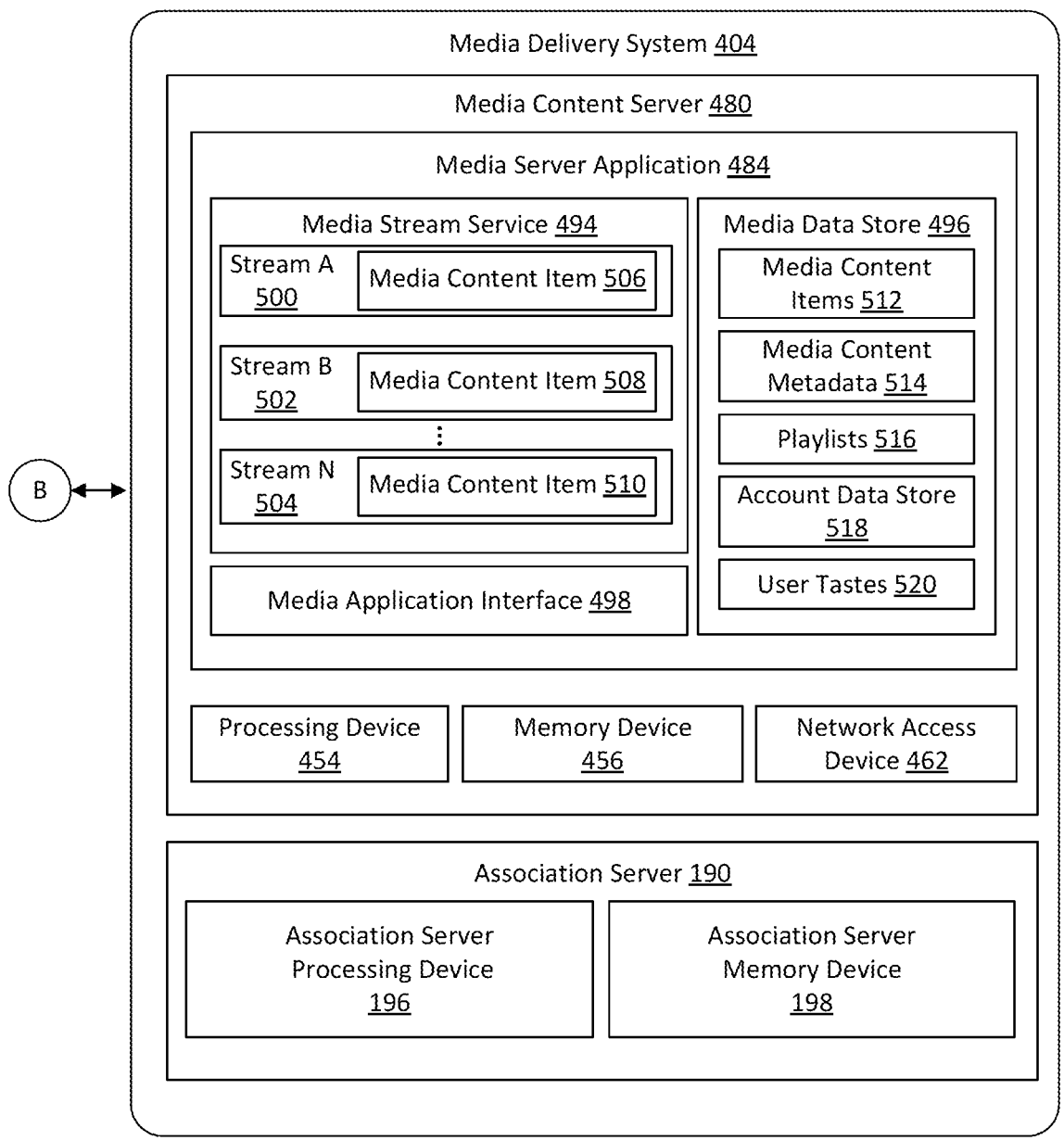

FIG. 4, which is made up of FIG. 4A and FIG. 4B, illustrates an example system 400 for association via a broadcast. The example system 400 illustrates the source device 110, the target device 150, and the association server 190 connected over a network 406. In the illustrated example, the association server 190 is part of a media delivery system 404 and this example system 400 is described in the context of media content item playback. This is for example purposes only. The techniques described herein can be used with a variety of systems.

Source Device

The source device 110 is a computing device. In some examples, the source device 110 is a computing device for playing media content items to produce media output. In some examples, the media content items are provided by the media-delivery system 404 and transmitted to the source device 110 using the network 406. A media content item is an item of media content, including audio, video, or other types of media content, which may be stored in any format suitable for storing media content. Non-limiting examples of media content items include songs, music, albums, audiobooks, music videos, movies, television episodes, podcasts, other types of audio or video content, and portions or combinations thereof.

The source device 110 plays the media content item for a user. The media content item is selectable for playback with user input. The media content item is also selectable for playback without user input, such as by the source device 110 or the media-delivery system 404. In an example, media content is selected for playback by the media-delivery system 404 based on a user taste profile stored in association with the source device account 114.

The source device 110 selects and plays media content and generates interfaces for controlling playback of media content items. In some examples, the source device 110 receives user input over a user interface, such as a touch screen user interface, an utterance-based user interface, tactile user interfaces, virtual user interfaces, or other user interfaces and plays a media content item based thereon.

The source device 110 can include other input mechanisms including but not limited to a keypad and/or a cursor control device. The keypad receives alphanumeric characters and/or other key information. The cursor control device includes, for example, a handheld controller or mouse, a rotary input mechanism, a trackball, a stylus, and/or cursor direction keys.

As noted above, in the example, the source device 110 plays media content items. In some examples, the source device 110 plays media content items that are provided (e.g., streamed, transmitted, etc.) by a system external to the media-playback device such as the media-delivery system 404, another system, or a peer device. Alternatively, in some examples, the source device 110 plays media content items stored locally on the source device 110. Further, in at least some examples, the source device 110 plays media content items that are stored locally as well as media content items provided by other systems.

In some examples, the source device 110 is a computing device, handheld entertainment device, smartphone, tablet, watch, wearable device, or any other type of device capable of playing media content. In yet other examples, the source device 110 is a media playback appliance, such as an in-dash vehicle head unit, an aftermarket vehicle media playback appliance, a smart assistant device, a smart home device, a television, a gaming console, a set-top box, a network appliance, a BLU-RAY disc player, a DVD player, a media player, a stereo system, smart speaker, an Internet-of-things device, or a radio, among other devices or systems.

In many examples, the source device 110 includes a user interface 452, one or more source device processing devices 116, and a source device memory device 118. In an example, the source device 110 includes a content output device 458. In an example, the source device 110 includes a movement-detecting device. In an example, the source device 110 includes a network access device 462. In an example, the source device 110 includes a sound-sensing device 464. Other examples may include additional, different, or fewer components.

The location-determining device 450 is a device that determines the location of the source device 110. In some examples, the location-determining device 450 uses one or more of the following technologies: Global Positioning System (GPS) technology that receives GPS signals from satellites, cellular triangulation technology, network-based location identification technology, WI-FI positioning systems technology, ultrasonic positioning systems technology, and combinations thereof. Examples of the location-determining device 450 further include altitude- or elevation-determining devices, such as barometers.

The user interface 452 operates to interact with the user, including providing output and receiving input. In an example, the user interface 452 is a physical device that interfaces with the user (e.g., touch screen display). In an example, the user interface 452 is a combination of devices that interact with the user (e.g., speaker and microphone for providing an utterance-based user interface).

In some examples, the user interface 452 includes a touch-screen-based user interface. A touch screen operates to receive an input from a selector (e.g., a finger, stylus, etc.) controlled by the user. In some examples, the touch screen operates as both a display device and a user input device. In some examples, the user interface 452 detects inputs based on one or both of touches and near touches. In some examples, the touch screen displays a user interface for interacting with the source device 110. Some examples of the source device 110 do not include a touch screen.

Examples of the user interface 452 include input control devices that control the operation and various functions of the source device 110. Input control devices include any components, circuitry, or logic operative to drive the functionality of the source device 110. For example, input control device(s) include one or more processors acting under the control of an application.

While some examples of the source device 110 do not include a display device, where a source device 110 does include a display device, the source device 110 will often include a graphics subsystem and coupled to an output display. The output display uses various technologies, such as TFT (Thin Film Transistor), TFD (Thin Film Diode), OLED (Organic Light-Emitting Diode), AMOLED (active-matrix organic light-emitting diode) display, and/or liquid crystal display (LCD)-type displays. The displays can also be touch screen displays, such as capacitive and resistive-type touch screen displays.

The one or more source device processing devices 116 include one or more processing units, such as central processing units (CPU), digital signal processors, and field-programmable gate arrays, among others.

The source device memory device 118 operates to store data and instructions. In some examples, the source device memory device 118 stores instructions to perform one or more operations described herein. Some examples of the source device memory device 118 also include a media content cache. The media content cache stores media content items, such as media content items that have been previously received from the media-delivery system 404. The media content items stored in the media content cache are storable in an encrypted or unencrypted format, and decryption keys for some or all of the media content items are also stored. The media content cache can also store metadata about media content items such as title, artist name, album name, length, genre, mood, or era. The media content cache can also store playback information about the media content items, such as the number of times the user has requested to playback the media content item or the current location of playback.

The source device memory device 118 typically includes at least some form of computer-readable media. Computer-readable media includes any available media that can be accessed by the source device 110. By way of example, computer-readable media include computer-readable storage media and computer-readable communication media.

Computer-readable storage media includes volatile and nonvolatile, removable and non-removable media implemented in any device configured to store information such as computer-readable instructions, data structures, program modules, or other data. Computer-readable storage media includes, but is not limited to, random access memory, read only memory, electrically erasable programmable read only memory, flash memory and other memory technology, compact disc read only memory, BLU-RAY discs, DVD discs, other optical storage, magnetic cassettes, magnetic tape, magnetic disk storage or other magnetic storage devices, or any other medium that can be used to store the desired information and that can be accessed by the source device 110. In some examples, computer-readable storage media is non-transitory computer-readable storage media.

Computer-readable communication media typically embodies computer-readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer-readable communication media includes wired media such as a wired network or direct-wired connection, and wireless media such as acoustic, radio frequency, infrared, and other wireless media. Combinations of any of the above are also included within the scope of computer-readable media.

In an example, the source device 110 has the one or more source device processing devices 116 coupled to the source device memory device 118 storing source device instructions which when executed cause the one or more source device processing devices 116 to perform one or more operations described herein.

The content output device 458 operates to output media content. In many examples, the content output device 458 provides media output for a user. In some examples, the content output device 458 provides media output to a target device 150. Examples of the content output device 458 include a speaker assembly having one or more speakers, an audio output jack, a BLUETOOTH transmitter, a display panel, and a video output jack. Other examples are possible as well, such as transmitting a signal through the audio output jack or BLUETOOTH transmitter to reproduce an audio signal by a connected or paired device such as headphones, speaker system, or vehicle head unit.

The network access device 462 operates to communicate with other computing devices over one or more networks, such as the network 406. Examples of the network access device include one or more wired network interfaces and wireless network interfaces. Examples of wireless network interfaces include infrared, BLUETOOTH wireless technology, WI-FI, 802.11a/b/g/n/ac, and cellular or other radio frequency interfaces.

In an example, the source device 110 further includes a broadcast receiver 466. The broadcast receiver 466 is a component able to receive a broadcast (e.g., as in operation 224). In many examples, the broadcast receiver 466 is not a component dedicated to receiving the broadcast. For example, the network access device 462 may operate as the broadcast receiver 466. In another example, the sound-sensing device 464 operates as the broadcast receive 466. In an example, the broadcast receiver 466 is a dedicated broadcast receiving device. In an example, the broadcast receiver includes an antenna. In an example, the antenna is a radiofrequency antenna. In an example, the radiofrequency antenna is preconfigured to receive short-wavelength ultra-high frequency radio waves. In an example, the radio waves are in the ISM (Industrial, Scientific and Medical) radio bands. In an example, the radio waves are approximately 2.4 GHz. In an example, the radio waves are associated with BLUETOOTH. In an example, the broadcast receiver 466 is able to receive broadcasts from a beacon. In an example, the beacon is a low-energy beacon. In an example, the beacon is a BLUETOOTH LOW ENERGY beacon. In an example, broadcast receiver 466 is preconfigured to receive broadcasts from a broadcast transmitter 468 of the target device 150. In an example, the broadcast receiver 466 is a transceiver.

In some examples, the source device 110 includes a movement-detecting device that senses movement of the source device 110, acceleration of the source device 110, determines an orientation of the source device 110, or includes other detecting devices. In at least some examples, the detecting devices include one or more accelerometers or other motion-detecting technologies or orientation-detecting technologies.

Network

The network 406 is an electronic communication network that facilitates communication between the source device 110, the media-delivery system 404, and in some instances, the target device 150. An electronic communication network includes a set of computing devices and links between the computing devices. The computing devices in the network use the links to enable communication among the computing devices in the network. The network 406 can include routers, switches, mobile access points, bridges, hubs, intrusion detection devices, storage devices, standalone server devices, blade server devices, sensors, desktop computers, firewall devices, laptop computers, handheld computers, mobile telephones, vehicular computing devices, and other types of computing devices.

In various examples, the network 406 includes various types of links. For example, the network 406 includes wired and/or wireless links, including BLUETOOTH, ultra-wideband (UWB), 802.11, ZIGBEE, cellular, and other types of wireless links. Furthermore, in various examples, the network 406 is implemented at various scales. For example, the network 406 is implemented as one or more vehicle area networks, local area networks (LANs), metropolitan area networks, subnets, wide area networks (such as the Internet), or can be implemented at another scale. Further, in some examples, the network 406 includes multiple networks, which may be of the same type or of multiple different types.

Target Device

The target device 150 can include one or more of the components of the source device 110. The aspects described herein are relevant to using the source device account 114 of the source device 110 on the target device 150. In an example, the association is performed using a broadcast transmitter 468 of the target device 150. In some examples, it is otherwise difficult for a user to provide account information to the target device 150, such as by the target device 150 lacking a keyboard, touch screen, or other components that facilitate arbitrary input. In some examples, the target device 150 lacks a direct connection to the source device 110 over BLUETOOTH, WI-FI, or other electronic communication schemes.

In an example, the target device 150 has one or more target device processing devices 156 coupled to a target device memory device 158 storing target device instructions which when executed cause the one or more target device processing devices 156 to perform one or more operations described herein.

The one or more target device processing devices 156 include one or more processing units, such as central processing units (CPU), digital signal processors, and field-programmable gate arrays, among others. The target device memory device 158 operates to store data and instructions.

The target device memory device 158 stores instructions to perform one or more operations described herein. Some examples of the target device memory device 158 also include a media content cache (e.g., a media content cache as described above in relation to the source device memory device 118). The target device memory device 158 typically includes at least some form of computer-readable media (e.g., computer-readable media as described above in relation to the source device memory device 118).

The sound-sensing device 464 senses sounds proximate the target device 150 (e.g., sounds within a vehicle in which the target device 150 is located). In some examples, the sound-sensing device 464 comprises one or more microphones. In some examples, the sound-sensing device 464 includes multiple microphones in a sound-canceling arrangement to facilitate operation in a noisy environment (e.g., configured for use in a vehicle). The sound-sensing device 464 is able to capture sounds from proximate the target device 150 and create a representation thereof. These representations are analyzed by the target device 150 or the media-delivery system 404.

In some examples, the representations are used to provide an utterance-based user interface. In such examples, speech-recognition technology is used to identify words spoken by the user. The words are recognized as commands affect the behavior of the target device 150 (e.g., affecting playback of media content by the target device 150). Natural language processing and/or intent-recognition technology are usable to determine appropriate actions to take based on the spoken words.

Additionally or alternatively, the sound-sensing device 464 determines various sound properties about the sounds proximate the user such as volume, dominant frequency or frequencies, among other properties. These sound properties are usable to make inferences about the environment proximate to the target device 150, such as whether the sensed sounds correspond to playback of a media content item. In some examples, the sound sensed by the sound-sensing device 464 are transmitted to media-delivery system 404 (or another external system) for analysis, such as using speech-recognition, intent-recognition, and media identification technologies, among others.

In an example, the target device 150 further includes a broadcast transmitter 468. The broadcast transmitter 468 is a component able to transmit a broadcast (e.g., as in operation 222). In many examples, the broadcast transmitter 468 is not a component dedicated to transmitting the broadcast. For example, the network access device 462 may operate as the broadcast transmitter 468. In another example, the content output device 458 operates as the broadcast transmitter 468. In an example, the broadcast transmitter 468 is a dedicated broadcast transmitting device. In an example, the broadcast transmitter 468 includes an antenna. In an example, the antenna is a radiofrequency antenna. In an example, the radiofrequency antenna is preconfigured to transmit short-wavelength ultra-high frequency radio waves. In an example, the radio waves are in the ISM (Industrial, Scientific and Medical) radio bands. In an example, the radio waves are approximately 2.4 GHz. In an example, the radio waves are associated with BLUETOOTH. In an example, the broadcast transmitter 468 is able to transmit broadcasts as a beacon. In an example, the beacon is a low-energy beacon. In an example, the beacon is a BLUETOOTH LOW ENERGY beacon. In an example, broadcast receiver 466 is preconfigured to transmit broadcasts to the broadcast receiver 466 of the source device 110. In an example, the broadcast transmitter 468 is a transceiver.

Media-Delivery System

The media-delivery system 404 includes one or more computing devices and provides media content items to the source device 110, target device 150, and, in some examples, other media-playback devices as well. In the illustrated example, the media-delivery system 404 includes a media content server 480 and the association server 190. Although FIG. 4 shows single instances of the media content server 480 and the association server 190 some examples include multiple servers. In these examples, each of the multiple servers may be identical or similar and may provide similar functionality (e.g., to provide greater capacity and redundancy, or to provide services from multiple geographic locations). Alternatively, in these examples, some of the multiple servers may perform specialized functions to provide specialized services (e.g., services to enhance media content playback during travel or other activities, etc.). Various combinations thereof are possible as well.

The media content server 480 transmits stream media to media-playback devices, such as the source device 110 or target device 150. In some examples, the media content server 480 includes a media server application 484, one or more processing devices 454, a memory device 456, and a network access device 462.

In some examples, the media server application 484 streams music or other audio, video, or other forms of media content. The media server application 484 includes a media stream service 494, a media data store 496, and a media application interface 498. The media stream service 494 operates to buffer media content such as media content items 506, 508, and 510, for streaming to one or more streams 500, 502, and 504.

The media application interface 498 can receive requests or other communication from media-playback devices or other systems, to retrieve media content items from the media content server 480. For example, the media application interface 498 receives communication from a media-playback engine.

In some examples, the media data store 496 stores media content items 512, media content metadata 514, and playlists 516. The media data store 496 may store one or more databases and file systems, such as the set of data structures 600 described in relation to FIG. 5. As noted above, the media content items 512 may be audio, video, or any other type of media content, which may be stored in any format for storing media content.

The account data store 518 is used to identify users. In an example, the account data store 518 is used to identify users of a media streaming service provided by the media-delivery system 404. In some examples, the media-delivery system 404 authenticates a user via data contained in the account data store 518 and provides access to resources (e.g., media content items 512, playlists 516, etc.) to a device operated by a user. In some examples, different devices log into a single account and access data associated with the account in the media-delivery system 404. User authentication information, such as a username, an email account information, a password, and other credentials, can be used for the user to log into his or her user account. A device can use stored credentials to log a user into the account on a device.

The media data store 496 includes user tastes data 520. The user tastes data 520 includes but is not limited to user preferences regarding media content items, such as media content items that the user likes/dislikes, media content item qualities that the user likes/dislikes, historical information about the user's consumption of media content, libraries of media content items, and playlists of media content items, among other user data.

The media content metadata 514 operates to provide various information associated with the media content items 512. In some examples, the media content metadata 514 includes one or more of title, artist name, album name, length, genre, mood, era, acoustic fingerprints, and other information. The playlists 516 operate to identify one or more of the media content items 512 and in some examples, the playlists 516 identify a group of the media content items 512 in a particular order. In other examples, the playlists 516 merely identify a group of the media content items 512 without specifying a particular order. Some, but not necessarily all, of the media content items 512 included in a particular one of the playlists 516 are associated with a common characteristic such as a common genre, mood, or era. The playlists 516 can include user-created playlists, which may be available to a particular user, a group of users, or to the public.

In some examples, the media server application 484 or a dedicated access management server provides access management services. In examples, the media server application 484 exposes application programming interface endpoints usable by calling devices or functions to use access management services, such as services for logging in to an account, obtaining credentials associated with an account, generating credentials associated with an account, and other services.

As described above, the association server 190 is a computing device remote from the source device 110 and the target device 150. In an example, the association server 190 manages providing the source device credentials 112 to the target device 150. In an example, the association server 190 has one or more association server processing devices 196 coupled to an association server memory device 198 storing association server instructions which when executed cause the one or more association server processing devices 196 to perform one or more operations described herein.

The one or more association server processing devices 196 include one or more processing units, such as central processing units (CPU), digital signal processors, and field-programmable gate arrays, among others.

The association server memory device 198 operates to store data and instructions. The association server memory device 198 stores instructions to perform one or more operations described herein. The association server memory device 198 typically includes at least some form of computer-readable media (e.g., computer-readable media as described above, such as in relation to the source device memory device 118).

Although in FIG. 4 only a single source device 110, target device 150, and media-delivery system 404 are shown, in accordance with some examples, the media-delivery system 404 supports the simultaneous use of devices, and the source device 110 and the target device 150 simultaneously access media content from multiple media-delivery systems 404. Additionally, although FIG. 4 illustrates a streaming media-based system for media playback, other examples are possible as well. For example, in some examples, the source device 110 includes a media data store and the source device 110 selects and plays back media content items without accessing the media-delivery system 404. Further in some examples, the source device 110 operates to store previously-streamed media content items in a local media data store (e.g., in a media content cache).

In at least some examples, the media-delivery system 404 streams, progressively downloads, or otherwise communicates music, other audio, video, or other forms of media content items to the source device 110 or target device 150 for later playback. In accordance with an example, the user interface 452 receives a user request to, for example, select media content for playback on the source device 110.

Software examples of the examples presented herein may be provided as a computer program product, or software, that may include an article of manufacture on a machine-accessible or machine-readable medium having instructions. The instructions on the non-transitory machine-accessible machine-readable or computer-readable medium may be used to program a computer system or other electronic device. The machine- or computer-readable medium may include, but is not limited to, magnetic disks, optical disks, magneto-optical disks, or other types of media/machine-readable medium suitable for storing or transmitting electronic instructions. The techniques described herein are not limited to any particular software configuration. They may find applicability in any computing or processing environment. In some examples, there are one or more processors that operate as a particular program product or engine. In some examples, one or more processors are coupled to a memory storing instructions which when executed cause the one or more processors to operate in a particular manner. In some examples, the one or more processors include two or more sets of processors operating on different devices.

The terms "computer-readable", "machine-accessible medium" or "machine-readable medium" used herein shall include any medium that is capable of storing, encoding, or transmitting a sequence of instructions for execution by the machine and that causes the machine to perform any one of the methods described herein. Further, it is common in the art to speak of software, in one form or another (e.g., program, procedure, process, application, module, unit, logic, and so on), as taking an action or causing a result. Such expressions are merely a shorthand way of stating that the execution of the software by a processing system causes the processor to perform an action to produce a result.

Some examples include a computer program product. The computer program product may be a storage medium or media having instructions stored thereon or therein which can be used to control, or cause, a computer to perform any of the procedures of the examples of the invention. The storage medium may include without limitation an optical disc, a ROM, a RAM, an EPROM, an EEPROM, a DRAM, a VRAM, a flash memory, a flash card, a magnetic card, an optical card, nanosystems, a molecular memory integrated circuit, a RAID, remote data storage/archive/warehousing, and/or any other type of device suitable for storing instructions and/or data.

Stored on any one of the computer-readable medium or media, some implementations include software for controlling both the hardware of the system and for enabling the system or microprocessor to interact with a human user or other mechanism utilizing the results of the examples of the invention. Such software may include without limitation device drivers, operating systems, and user applications. Ultimately, such computer-readable media further include software for performing example aspects of the invention, as described above.

Included in the programming and/or software of the system are software modules for implementing the procedures described above.

Various operations and processes described herein can be performed by the cooperation of two or more devices, systems, processes, or combinations thereof.

Set of Data Structures

Figure 5:
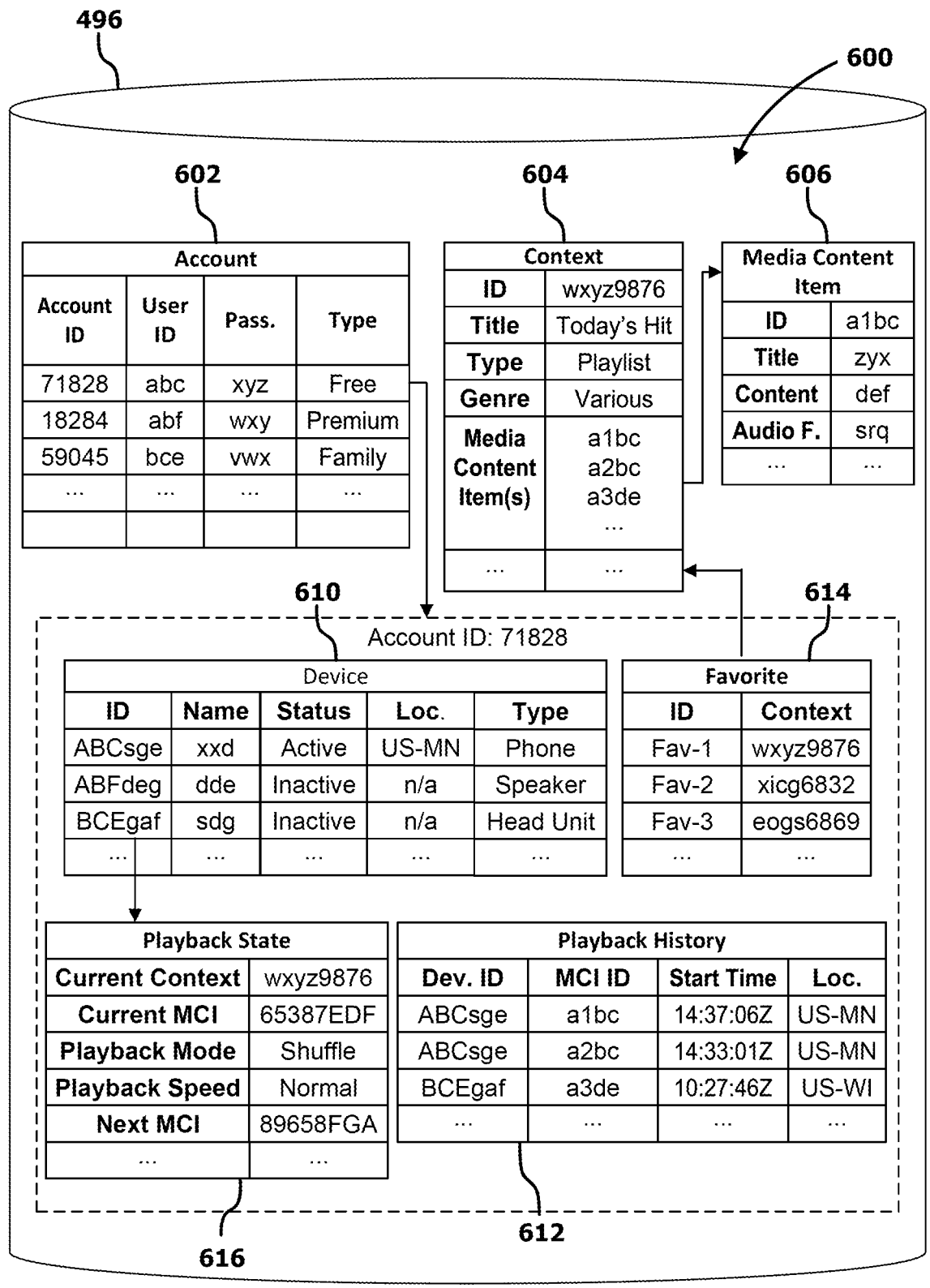
FIG. 5 illustrates an example set of data structures according to an example embodiment.

FIG. 5 illustrates an example set of data structures 600 storable in the media data store 496. As illustrated, the set of data structures 600 includes an account table 602, a media content item context data structure 604, and a media content item data structure 606. For each account record in the account table 602, the set of data structures 600 includes a device data table 610, a playback history table 612, a favorite table 614, and a playback state data structure 616. It is noted that, where user data is used, it can be handled according to a defined user privacy policy and can be used to the extent allowed by the user. Where the data of other users is used, it can be handled in an anonymized matter so the user does not learn of the details of other users generally or specifically. In addition, the data contained in the set of data structures 600 is stored according to a defined security policy and in accordance with applicable regulations.

As illustrated, each account record in the account table 602 has a relationship with a device data table 610, a playback history table 612, and a favorite table 614. Each device record in the device data table 610 has a relationship with a playback state data structure 616. Each device record in a favorite table 614 has a relationship with a media content item context data structure 604. Each context data structure has a relationship with the media content item data structure 606.

The account table 602 stores one or more account records usable to identify accounts of the media-delivery system 404. In an example, where a particular account is referred to in this disclosure (e.g., the target device account 154), the account is associated with an entry stored in the set of data structures 600. In an example, when the target device 150 accesses the media-delivery system 404 under the target device account 154, the media-delivery system 404 locates an account record corresponding to the target device account 154 in the account table 602. The media-delivery system 404 then uses the data associated with the account record in the account table 602 to provide services associated with that account. For instance, the media-delivery system 404 provides a media content item described in the favorite table 614 to the target device 150 and updates the playback history table 612 accordingly.

The account table 602 references one or more other tables, and is referenced by one or more other tables. In an example, each account record of the account table 602 corresponds to an account. For instance, the target device account 154 corresponds to a target device account record in the account table 602, and the source device account 114 corresponds to a source device account record in the account table 602. Each account record of the account table 602 includes data associated with one or more fields of the account table 602, such as an account ID field, a user ID field, a password field, and a type field. The account ID field stores an identifier of the account record, such as using a number. The user ID field stores an identifier of a user, such as the user's name. The password field stores data associated with a password of the user, such as a hashed and salted password. The type field identifies subscription types associated with the account record.

Each account record identified in the account table 602 is associated with, and identifies, data for providing various services from the media-delivery system 404. In some examples, the data includes the device data table 610, the playback history table 612, the favorite table 614, and the playback state data structure 616, among others. In the illustrated example, the tables 610, 612, and 614 are primarily described in association with a single record (e.g., the record having the Account ID: 71828). However, it is understood that, in other examples, the tables 610, 612, and 614 are structured to be associated with a plurality of accounts The device data table 610 identifies one or more devices associated with a particular account record of the account table 602. The device data table 610 is referenced by the account table 602 or other tables. The device data table 610 can reference one or more other tables.

In an example, each device record of the device data table 610 includes data associated with a device. For instance, a first device record of the device data table 610 corresponds to the source device 110, and a second device record of the device data table 610 corresponds to the target device 150 once both devices 110, 150 have been associated with the same account. Each device record of the device data table 610 includes data associated with one or more fields of the device data table 610, such as a device ID field (e.g., storing device identifier data, such as an alphanumeric identifier), a name field (e.g., for storing a device name), a status field (e.g., for storing a status of the device, such as whether the device is currently active or inactive), a location field (e.g., for storing a last-known location of the device), and type field (e.g., for storing a type of the device, such as a phone device, a speaker device, or a vehicle head unit).

The playback history table 612 describes the media content items played by the account by storing one or more playback records. The playback history table 612 can reference and be referenced by one or more other tables. In an example, each playback record of the playback history table 612 includes data associated with a media content item played by a respective account or device. Each playback record of the playback history table 612 includes data associated with one or more fields of the playback history table 612, such as a device ID field (e.g., for storing an identifier of the device that caused playback of the playback record), an MCI (Media Content Item) ID field (e.g., for storing an identifier of the media content item that was played back), a start time field (e.g., for identifying the start time at which the media content item was played back), and a location field (e.g., for identifying the location of the device associated with the device ID when playback was initiated).

The favorite table 614 describes information about favorite media content item contexts associated with the account by storing one or more favorite records. The favorite table 614 includes information about favorites associated with an account. The favorite table 614 can reference and be referenced by one or more other tables. In an example, each favorite record of the favorite table 614 includes data associated with a favorite media content item context (e.g., album or playlist). Each favorite record of the favorite table 614 includes data associated with one or more fields of the favorite table 614, such as an ID field (e.g., for identifying the favorite record) and a context field (e.g., for identifying a media content item context associated with the favorite record).

The context data structure 604 is a data structure (e.g., record of a table or other data structure) that contains data associated with a media content item context (e.g., album or playlist). The context data structure 604 can reference and be referenced by one or more tables or other data structures. The context data structure 604 stores data regarding a particular media content item context in one or more fields, such as an ID field (e.g., for identifying the context data structure 604), a title field (e.g., a string naming the context data structure 604), a type field (e.g., for describing the type of the media content item context, such as a playlist, album, or television season), and media content item field (e.g., for identifying one or more media content items of the context data structure 604)

The media content item data structure 606 is a data structure (e.g., record of a table or other data structure) that contains data associated with a media content item. The media content item data structure 606 can reference and be referenced by one or more tables or other data structures. The media content item data structure 606 stores data regarding a particular media content item in one or more fields, such as an ID field (e.g., storing an identifier of the media content item data structure 606), a title field (e.g., storing a title of the media content item data structure 606, such as a song title), a content field (e.g., storing the content of the media content item or a link to the content of the media content item data structure 606, such as the audio content of a song), and an audio fingerprint field. In an example, the audio fingerprint field stores an audio fingerprint of the content of the media content item data structure 606.

The playback state data structure 616 is a data structure (e.g., a record of a table or other data structure) that contains data associated with a state of a device (e.g., a state associated with a device record of the device data table 610). The playback state data structure 616 can reference and be referenced by one or more tables or other data structures. The playback state data structure 616 stores data regarding a particular playback state in one or more fields, such as a current context field (e.g., describing a current context from which a device is playing, such as by containing an identifier of the context), a current MCI (Media Content Item) (e.g., describing a current media content item that is playing, such as by containing an identifier of the media content item), a playback mode field (e.g., describing a playback mode of the device, such as shuffle or repeat), a playback speed field (e.g., describing a current playback speed), and a next MCI field (e.g., describing the next media content item to be played).

Various operations and processes described herein can be performed by the cooperation of two or more devices, systems, processes, or combinations thereof.

While various examples of the present invention have been described above, it should be understood that they have been presented by way of example, and not limitation. It will be apparent to persons skilled in the relevant art(s) that various changes in form and detail can be made therein. Thus, the present invention should not be limited by any of the above described example embodiments, but should be defined only in accordance with the following claims and their equivalents. Further, the Abstract is not intended to be limiting as to the scope of the example embodiments presented herein in any way. It is also to be understood that the procedures recited in the claims need not be performed in the order presented.

The invention claimed is:

1. A system, comprising:
   a first device having one or more first device processing devices coupled to a first device memory device storing first device instructions that when executed cause the one or more first device processing devices to:
   provide a signal to a second device, causing the second device to enter an association mode;
   while the second device is in the association mode, receive an identification code request from the second device;
   provide an identification code to the second device in response to the request;
   receive an authorization message from a third device, wherein the authorization message from the third device is sent by the third device in response to the third device receiving authorization to associate the third with the second device;
   receive an authorization message from the second device, wherein the authorization message from the second device is sent by the second device in response to the second device receiving authorization to associate the second device with the third device; and
   associate the second device and the third device after receiving the authorization message from the third device and the authorization message from the second device, including to obtain at least one credential for an account of the third device and to provide the at least one credential to the second device.

2. The system of claim 1,
   wherein the first device is an association server;
   wherein the second device is a target device; and
   wherein the third device is a source device.

3. The system of claim 1, wherein the at least one credential is not provided to the third device.

4. The system of claim 1,
   wherein the device account is associated with content of a media delivery system; and
   wherein the at least one credential is usable to access the content of the media delivery system.

5. The system of claim 1,
   wherein the at least one credential is obtained from a data store.

6. The system of claim 5, wherein the at least one credential is selected using an identifier of the third device.

7. A system, comprising:
   a first device having one or more first device processing devices coupled to a first device memory device storing first device instructions that when executed cause the one or more first device processing devices to:
   enter an association mode in response to at least one of:
     (i) lacking at least one credential associated with a second device;
     (ii) receiving a signal provided by the second device or a third device; or
     (iii) receiving a command over a voice-based user interface of the first device;
   obtain an identification code;
   broadcast the identification code;
   send an authorization message to the third device in response to receiving an authorization to associate the first device with the second device; and
   receive, from the third device, after broadcasting the identification code, at least one credential for a device account of the second device to associate the first device and the second device.

8. The system of claim 7,
   wherein the first device is a target device;
   wherein the second device is a source device; and
   wherein the third device is an association server.

9. The system of claim 7, wherein the at least one credential for the device account is not provided to the second device.

10. The system of claim 7,
    wherein the device account is associated with content of a media delivery system; and
    wherein the at least one credential for the device account is usable to access the content of the media delivery system.

11. The system of claim 7, wherein the identification code is broadcast using an audio signal.

12. The system of claim 7, wherein the identification code is broadcast in a light signal.

13. A system, comprising:
    a first device having one or more first device processing devices coupled to a first device memory device storing first device instructions that when executed cause the one or more first device processing devices to:
    receive a broadcast including an identification code from a second device, the identification code being broadcast after the second device enters an association mode in response to lacking at least one credential associated with the first device;
    obtain, in response to receiving the broadcast, authorization to associate with the second device; and
    send an authorization message to a third device in response to obtaining authorization to associate the first device with the second device,
    wherein at least one credential for a device account of the first device is provided to the second device to associate the first device and the second device.

14. The system of claim 13,
    wherein the first device is a source device;
    wherein the second device is a target device; and
    wherein the third device is an association server.

15. The system of claim 13, wherein the authorization message includes the identification code.

16. The system of claim 15, wherein the authorization message includes an identification of the device account.

17. The system of claim 13, wherein the at least one credential associated with the account is provided to the second device without providing the at least one credential associated with the first device to the first device.

18. The system of claim 13,
    wherein the device account is associated with content of a media delivery system; and
    wherein the at least one credential associated with the account is usable to access the content of the media delivery system.

* * * * *